US011395556B2

(12) United States Patent
Spotorno et al.

(10) Patent No.: US 11,395,556 B2
(45) Date of Patent: Jul. 26, 2022

(54) APPARATUS FOR AUTOMATIC AND FAST COOKING OF FOOD

(71) Applicant: Giannantonio Spotorno, Bergamo (IT)

(72) Inventors: Giannantonio Spotorno, Bergamo (IT); Cesare Spotorno, Bergamo (IT)

(73) Assignee: Giannantonio Spotorno, Bergamo (IT)

( * ) Notice: Subject to any disclaimer, the term of this patent is extended or adjusted under 35 U.S.C. 154(b) by 0 days.

(21) Appl. No.: 17/433,625

(22) PCT Filed: Feb. 14, 2020

(86) PCT No.: PCT/IB2020/051261
§ 371 (c)(1),
(2) Date: Aug. 25, 2021

(87) PCT Pub. No.: WO2020/174312
PCT Pub. Date: Sep. 3, 2020

(65) Prior Publication Data
US 2022/0039584 A1   Feb. 10, 2022

(30) Foreign Application Priority Data

Feb. 27, 2019   (IT) .................... 102019000002861

(51) Int. Cl.
*A47J 27/08*     (2006.01)
*A47J 27/00*     (2006.01)
(Continued)

(52) U.S. Cl.
CPC ........... *A47J 27/004* (2013.01); *A47J 27/086* (2013.01); *A47J 27/088* (2013.01); *A47J 27/09* (2013.01);
(Continued)

(58) Field of Classification Search
CPC  A47J 27/088; A47J 27/08; A47J 27/09; A47J 27/082; A47J 27/0802; H05B 6/1245; H05B 6/1272
(Continued)

(56) References Cited

U.S. PATENT DOCUMENTS 2,563,563 A   8/1951  Swenson
2,860,811 A   11/1958 Hessler
(Continued)

FOREIGN PATENT DOCUMENTS

CN   105942847 A   9/2016
CN   107411544 A   12/2017
(Continued)

*Primary Examiner* — Reginald Alexander
(74) *Attorney, Agent, or Firm* — Dickinson Wright PLLC; Andrew D. Dorisio

(57) ABSTRACT

Apparatus for automatic and fast cooking of food comprising: a base structure (12) in the form of a vessel open at the top housing a vertical pressure cooker (10); said apparatus comprises a solenoid (13) positioned close to said cooker; said solenoid is positioned below the cooker and beside the cooker covering a height ranging from 50% to 70% of the total height of the cooker starting from the bottom; said solenoid is made of coils with variable pitch widening from bottom to top; said pressure cooker (10) comprises: a lid (15) having a closing system; a pressure release valve (30); a temperature measurement system (70-76); where said cooker operates at a temperature higher than 140° C.

13 Claims, 3 Drawing Sheets

(51) Int. Cl.
*A47J 27/086* (2006.01)
*A47J 27/09* (2006.01)
*A47J 27/088* (2006.01)
*H05B 6/12* (2006.01)

(52) U.S. Cl.
CPC ............. *H05B 6/1245* (2013.01); *A47J 27/08* (2013.01); *A47J 2027/008* (2013.01); *H05B 6/1272* (2013.01)

(58) Field of Classification Search
USPC ........... 99/358, 451, DIG. 14; 219/440, 431, 219/432, 621, 622
See application file for complete search history.

(56) References Cited

U.S. PATENT DOCUMENTS

| | | | |
|---|---|---|---|
| 5,201,797 A * | 4/1993 | Weng | A23L 3/01 126/369 |
| 5,386,102 A * | 1/1995 | Takikawa | H05B 6/1227 219/620 |
| 5,564,328 A | 10/1996 | Huang | |
| 6,028,297 A * | 2/2000 | Hamada | A47J 27/62 219/625 |
| 9,307,862 B2 * | 4/2016 | Roever | H05B 6/06 |
| 2008/0047948 A1 * | 2/2008 | Rosenbloom | A47J 36/26 219/386 |
| 2010/0193521 A1 * | 8/2010 | Hasegawa | A47J 27/09 220/316 |
| 2015/0245421 A1 * | 8/2015 | Heczko | H05B 6/1245 99/323.3 |
| 2016/0234886 A1 * | 8/2016 | Laghi | H05B 6/06 |
| 2017/0290452 A1 * | 10/2017 | Guillaume | A47J 27/0802 |
| 2021/0362279 A1 * | 11/2021 | Chohan | G05D 23/1927 |

FOREIGN PATENT DOCUMENTS

| | | |
|---|---|---|
| EP | 3403544 A1 | 11/2018 |
| KR | 20110003651 A | 1/2011 |
| WO | 2011151698 A1 | 12/2011 |
| WO | 2015133115 A1 | 9/2015 |

\* cited by examiner

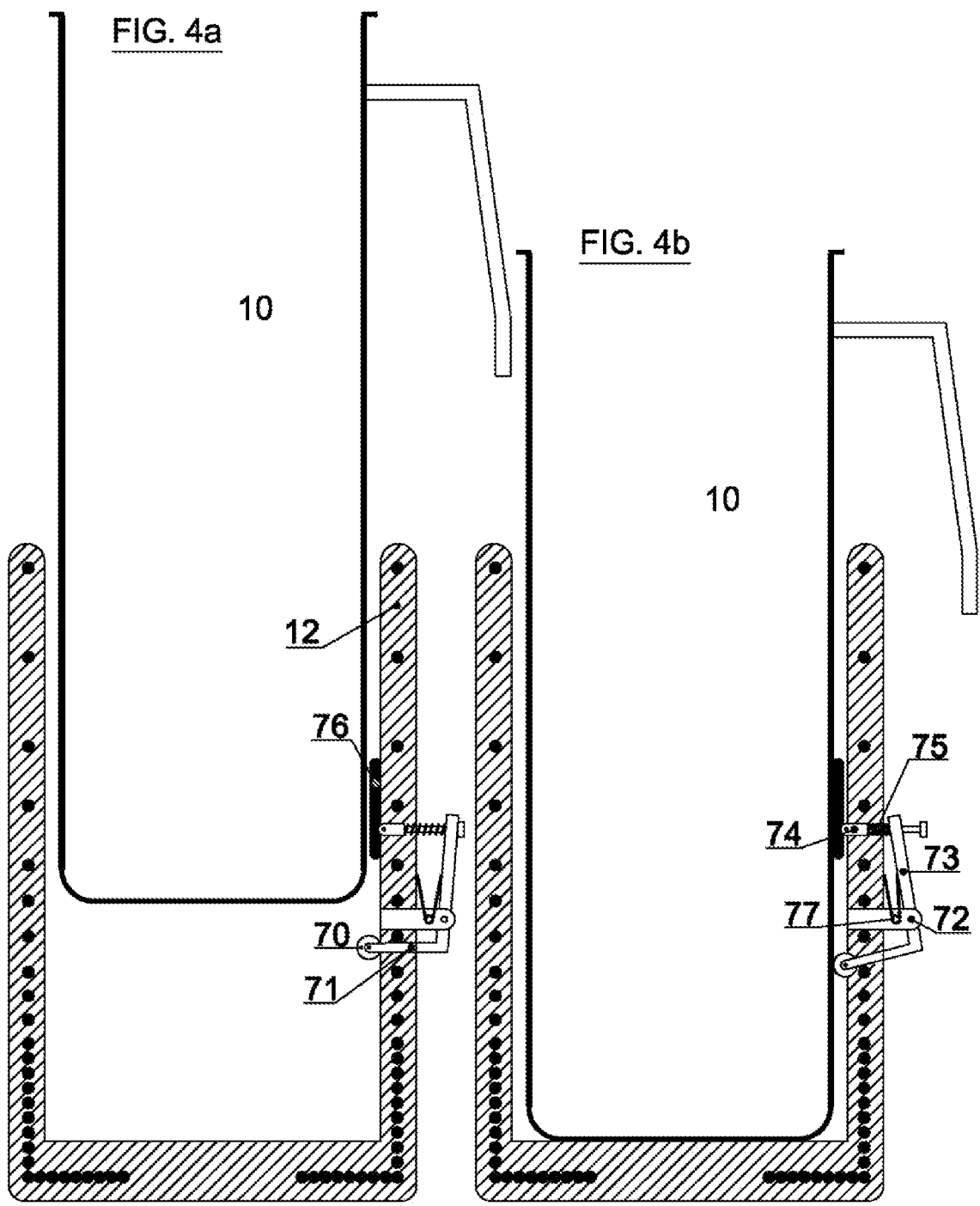

APPARATUS FOR AUTOMATIC AND FAST COOKING OF FOOD

TECHNICAL FIELD

The present invention refers to an apparatus for automatic and fast cooking of food, and in particular for fast cooking of pasta. It also applies to the cooking of maize flour for polenta, legumes, cereals, greens, vegetables, meat, fish and rice.

BACKGROUND

A first apparatus for cooking pasta is known from the Italian patent no. 1226495, in the name of the same applicant.

The apparatus described constitutes a machine (or dispenser) which via the introduction of a token or coin or the operation of a switch automatically deposits, in a single-use container (plate), a portion of cooked pasta with topping.

The portion of pasta, before being deposited on the above plate, never comes into contact with any physical person or elements extraneous to the dispenser.

The water is heated by means of a laminated core transformer connected to the electricity supply network at 50 Hz and a secondary circuit associated with the cooker.

A second technologically advanced apparatus for cooking pasta is known from the Italian patent no. 1400027, in the name of the same applicant.

This patent describes an apparatus and a method for cooking pasta, which offers very fast cooking. The cooker is heated with a transformer having a primary circuit and a secondary circuit which operate at a frequency higher than 5 KHz and typically at 20 KHz, and where the secondary circuit consists directly of the cooker.

Another apparatus that allows fast cooking of pasta is known from the Italian patent application no. 102017000109631 in the name of the same applicant, and is made with variable pitch heating coils.

SUMMARY

The object of the present invention is to provide an apparatus for automatic and fast cooking of food, and in particular for fast cooking of pasta.

In accordance with the present invention, said scopes and others still are achieved by an apparatus for automatic and fast cooking of food comprising: a base structure in the form of a vessel open at the top housing a vertical pressure cooker; said apparatus comprises a solenoid located in the vicinity of said cooker; said solenoid is located below the cooker and beside the cooker over a height comprised between 50% and 70% of the total height of the cooker starting from the bottom; said solenoid is made of coils with variable pitch increasing from bottom to top; said pressure cooker comprises: a lid having a closing system; a pressure release valve; a temperature measurement system; where said cooker operates at a temperature higher than 140° C.

Further characteristics of the invention are described in the dependent claims.

BRIEF DESCRIPTION OF THE DRAWINGS

The characteristics and advantages of the present invention will be evident from the following detailed description of a practical embodiment thereof, illustrated by way of non-limiting example in the attached drawings, in which:

FIG. 4a shows schematically a temperature sensor of an apparatus for automatic and fast cooking of food, in the positioning phase, in accordance with the present invention;

FIG. 4b shows schematically a temperature sensor of an apparatus for automatic and fast cooking of food, positioned in accordance with the present invention.

DETAILED DESCRIPTION

Figure 1:
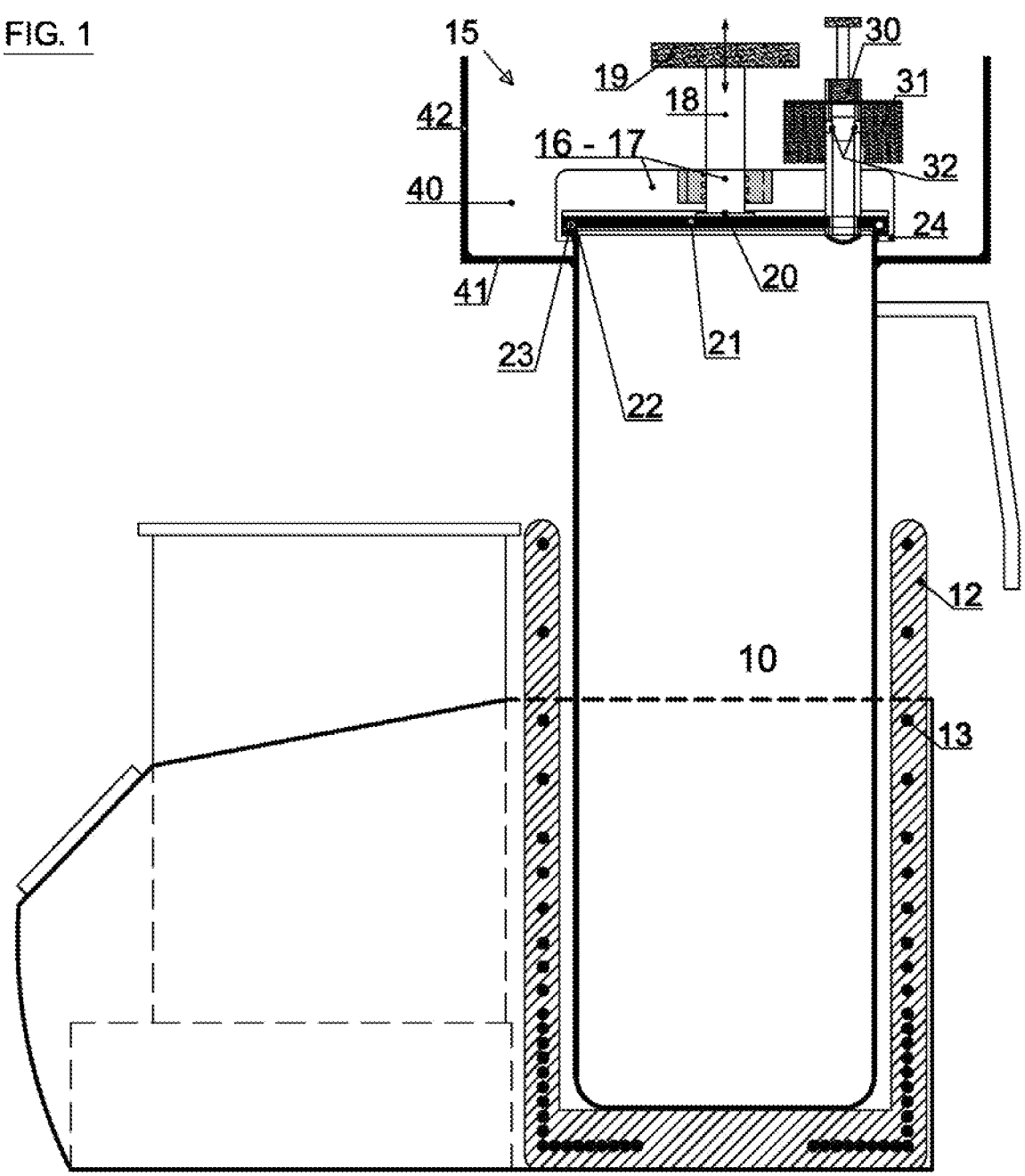
FIG. 1 shows schematically an apparatus for fast cooking of food, seen from the side and in section, in accordance with the present invention.

Referring to the attached figures, an apparatus for automatic and fast cooking of food, in accordance with the present invention, comprises a cooker 10 adapted to be positioned in a seat 12 which is heated by a solenoid 13, positioned below the cooker and beside the cooker having a height ranging from 50% to 70% of the total height of the cooker 10, starting from the bottom, and made with coils having variable pitch increasing from bottom to top.

The solenoid starts with a narrow pitch below the cooker and at the base thereof, with a pitch widening towards the top. The solenoid covers 50% to 70% of the height of the cooker 10.

The solenoid is powered at a frequency between 20 and 50 KHz, preferably 25 KHz.

The cooker 10 has a markedly vertical development, according to a height of at least 3 times its diameter, to allow cooking even of long pasta like spaghetti (the length of which is 250-260 mm), bucatini, tagliatelle and similar without being broken, in the Italian tradition. This verticality allows cooking using less water and therefore less energy than the traditional systems.

A vessel that heats any type of previously prepared sauce using the heat of the solenoid 13 can be positioned beside the cooker 10.

The cooker 10 is a pressure cooker. It therefore comprises a lid 15 formed of a bar 16 having a threaded through hole 17 in the centre.

In the hole 17 a pin 18 is screwed terminating on one side (outer) in a knob 19 and on the other side (inner) in a presser device 20. The presser device 20 pushes a disc 21 which acts as a lid for the cooker and abuts against the protruding edges 22 of the cooker 10.

A circular seal 23 is positioned between the disc 21 and the edges 22.

The bar 16 has at the sides hooks 24, which abut below the protruding edges 22 of the cooker 10.

When the knob is closed, it pushes the disc 21 against the upper part of the edges 22, pulling the hooks 24 which abut against the lower part of the edges 22.

To open the lid 15, the knob 19 is unscrewed thus freeing the disc 21. The bar 16 is rotated until it encounters at least a bevel in the edges 22 (namely a slight recess in the edge 22) of the cooker 10 so that the bar 16 including the pin 18 and the knob 19 can be removed.

The lid 15 also comprises a pressure release valve 30 for immediately relieving the pressure at the end of cooking, which comprises a backsplash 31, used as an obstacle (breakwater) to the violence of the spray outflow, due to the rapid pressure release, such as froth caused by the starch and water and steam, from the valve 30 when it is opened in order to then open the lid 15.

The valve 30 never discharges, even partially, during normal operation of the apparatus.

The valve 30 is therefore used as a valve for releasing the pressure at the end of cooking.

A safety valve (not shown) also exists set at a pressure higher than the normal operating pressure (it is set to 7 bar, for example).

It should be noted that, unlike ordinary pressure cookers, stabilization of the pressure is managed by the software and not by periodic openings typical of the traditional pressure release valves; the valve 30 is therefore used only and exclusively at the end of cooking, to release the pressure.

In the inner face of said lid 15, at the base of the valve 30, there is a removable mesh filter, to avoid the suction of rice or small parts of other food, during the deliberately fast pressure release phase.

The backsplash 31 is composed of a mesh cylinder closed at the top and open at the bottom to cover the outlet holes 32 of the valve 30.

The cooker 10 further comprises, at the top and fixed slightly below the edges 22, a vessel 40 formed of a horizontal circular crown 41 having the inner circumference fixed to the cooker 10 and the outer circumference fixed to a cylinder 42 open at the top.

The vessel 40 is formed of a base consisting of the disc 21 and the circular crown 41 and the cylinder 42 forms the side walls. The vessel 40 has a diameter greater than the diameter of the cooker to facilitate opening and closing of the lid 15 and is used to contain all the discharges, the turbulence of which has already been abated by the backsplash 31, when the valve 30 and therefore the disc 21 are opened at the end of cooking.

Figure 2:
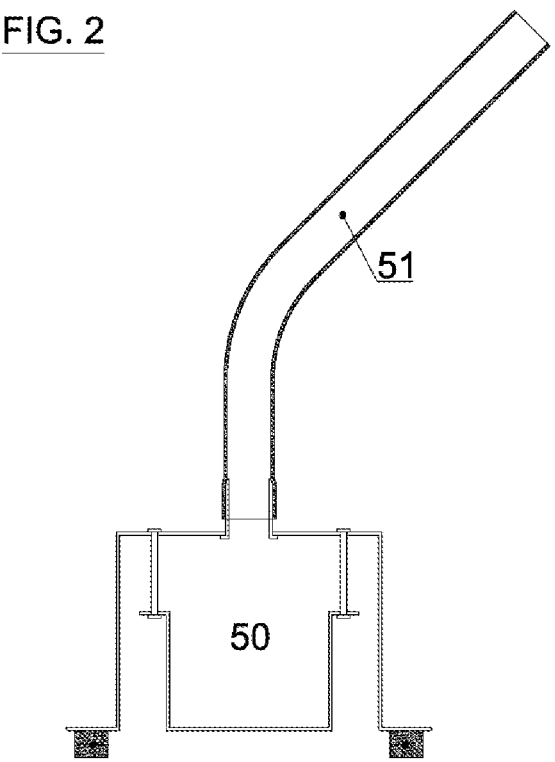
FIG. 2 shows schematically a variation of a backsplash of an apparatus for automatic and fast cooking of food, seen from the side and in section, in accordance with the present invention.

Alternatively to the backsplash 31, there is the variation 50 (FIG. 2) of the backsplash device which, by means of the tube 51 connected to the holes 32 of the valve 30, discharges the vapours (water, starch, etc.) externally, for example into a purposely provided drain connected to the wall or the kitchen sink.

The valve 30 can be opened and closed by means of a knob or a solenoid valve.

Figures 3A, 3B:
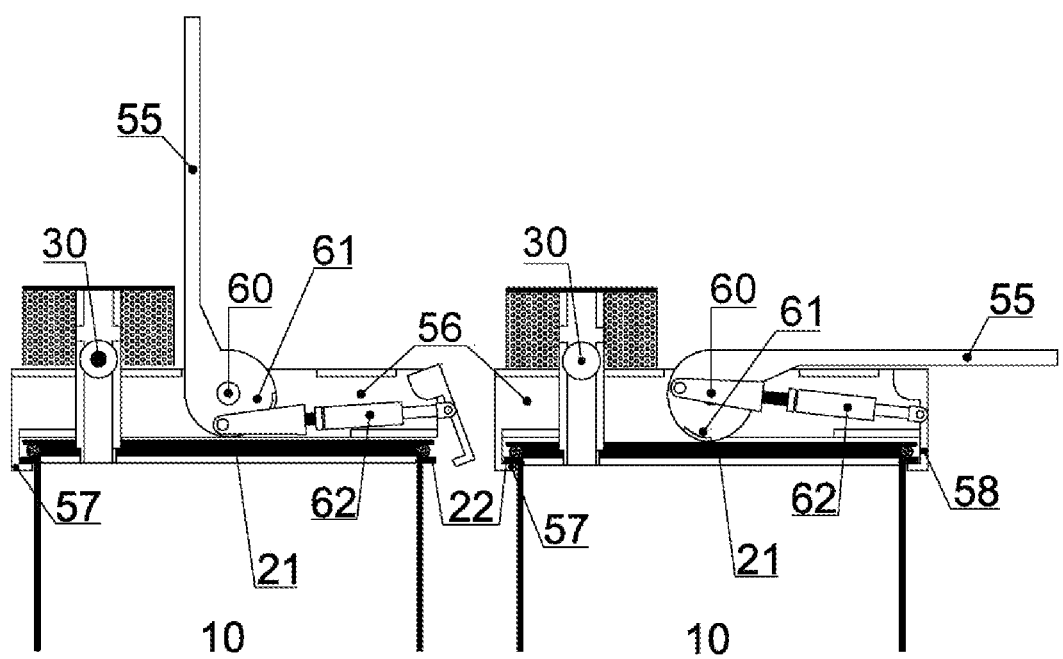
FIG. 3a shows schematically an open lid of an apparatus for automatic and fast cooking of food, seen from the side and in section, in accordance with the present invention.
FIG. 3b shows schematically a closed lid of an apparatus for automatic and fast cooking of food, seen from the side and in section, in accordance with the present invention.

Alternatively to the pin 18 to close the disc 21, the lever 55 can be used (FIGS. 3a/3b). Said lever 55 is centrally constrained on the bar 56 by means of the pin 60. The bar 56 has a fixed hook 57 on one side which abuts against the lower part of the protruding edges 22 of the cooker 10 and on the other side a movable hook 58 which, operated by the movement of the lever 55, also abuts against the lower part of the edges 22.

The lever 55 has an eccentric 61 connected by means of a rod 62 to the movable hook 58.

The lever 55 presses the disc 21, by means of the eccentric 61.

The lids, which differ in terms of design and mechanisms, are interchangeable and can be used in the same apparatus, as preferred by the user.

The inside of the cooker 10 can house a perforated basket, not shown, of the colander type, extractable, and having a handle, to facilitate and accelerate preparation of the pasta. The cooker can further comprise means for shaking the basket, for example, by means of a bar that penetrates into the cooker connected to the basket.

All the cooking phases, like management of the solenoid power-supply, cooking duration and temperature measurement, are managed by a control centre (not shown), programmable by the operator.

The possibility of removing the cooker does not allow the use of direct contact sensors; on the other hand, however, dirt can easily deposit in a remote temperature detection system, making it hazardous. The temperature detection must therefore be performed by direct mechanical contact of the sensor with the cooker.

A movable support has therefore been purposely provided (FIGS. 4a/4b), which automatically brings the temperature detector near to the cooker while the latter is being lowered into the cooking apparatus.

Lastly, when the cooker reaches its final operating position, said movable support uses a spring which pushes the temperature sensor against the cooker, with a certain pressure, to guarantee a reliable temperature reading.

In particular the apparatus comprises inside the seat 12 a roller 70 fixed to an arm 71 of an L-shaped structure which extends outside the seat 12, which is pushed outwards by the spring 77 and which can rotate around a pin 72 which is fixed to a rod perpendicular to the seat 12.

The upper end of the other arm 73 of the L-shaped structure pushes a rod 74 and a spring 75, said rod 74 crosses the seat 12 and is fixed to the temperature sensor 76.

When the cooker 10 is lowered into its seat 12 and the bottom of the cooker 10 hits the roller 70, the latter pushes the arm 71 outwards and causes the arm 73 to rotate, pushing the spring 75 and consequently the rod 74 and the temperature sensor 76 against the cooker 10.

At the end of cooking, once the pressure has been released and the lid has been opened, the basket is raised by appropriate springs as far as necessary to be easily extracted in cases in which, as for pasta, the cooking water has to be separated from the cooked food.

Since the main object of the present apparatus is the speed of each phase of the cooking process, also the pressure release phase must be performed practically instantaneously.

The backsplash 31 provides protection during opening (manual or automatic) of the valve 30, while the discharge receiver, namely the vessel 40, collects all froth and residue of the cooking water and allows the pressure created, due to the heat, to be restored to barometric level inside the interchangeable container (cooker).

The operation of the apparatus is such that water is placed in the cooker 10, the basket and the pasta (or other foods) are placed inside, the apparatus is switched on, and the cooking temperature and maximum cooking time are set. When a first cooking temperature previously fixed and/or in any case pre-set by the manufacturer is reached, measured by the temperature sensor, the apparatus autonomously switches off and most of the cooking is carried out by thermal inertia, namely with the machine switched off.

When the temperature drops below a second temperature lower than the first temperature by a pre-set value, the apparatus switches back on.

At the end of cooking, the pressure release valve 30 is opened and the backsplash 31 protects against splashes and outflow of water which are kept inside the vessel 40.

The cooker lid can then be opened and the basket can be extracted, leaving the cooking water to drain, with the pasta ready to be served.

Thanks to the particular arrangement of the solenoid, the water is heated from the bottom of the cooker and also from the side walls. This means that the cooker heats up more rapidly.

Furthermore, the vertical variable pitch of the solenoid allows the centre of heat of the cooker to be moved to the desired height defined at the design stage; in particular the centre of heat is preferably positioned towards the lower part of the cooker and, at the same time, also the side walls are heated, accelerating the cooking speed.

This favours turbulence of the convective motions inside the cooker, and these also contribute to considerably speeding up cooking of the food.

The cooker 10 is made of ferritic stainless steel and the lid 15, as well as the safety and pressure release valves are constructed so that the cooker can be used at a pressure ranging from 2 to 6 bar and in particular at a pressure higher than 4 bar, where the temperature reaches approximately 140° C., (approximately 10° C. for each bar of pressure) unlike traditional pressure cookers which operate at lower temperature and pressure.

It has been proved that working at 4-5 bar and therefore at a temperature ranging from 140° C. to 150° C., the pasta cooking time is reduced to a quarter with respect to the cooking time given on the packet. For example it is reduced from 10 minutes to 2.5 minutes.

The cooking operating temperature (between 140° C. and 150° C.), given the vertical shape of the cooker which allows the volume of water to be limited, is quickly reached with a 3 Kw solenoid and in particular in less than one minute; the apparatus then switches off and continues to cook for 2.5 minutes. In one cooking cycle, the apparatus remains off for approximately 60% (from 50% to 70%) of the total cooking time.

The operation of the cooker and in particular powering of the solenoid is controlled by a control centre (not shown) based on measurement of the temperature by means of the temperature sensor 76.

The control centre is set to power the solenoid, for example to reach the temperature of 140° C. and therefore an internal pressure of 4 bar, or any other desired temperature.

The cooker and therefore the apparatus can have any dimensions according to requirements and the state of the art.

The apparatus thus conceived is subject to numerous modifications and variations, all falling within the scope of the inventive concept; furthermore, all the details can be replaced by technically equivalent elements.

The invention claimed is:

1. An apparatus for automatic and fast cooking of food comprising: a base structure in the form of a vessel open at the top in which a vertical pressure cooker is housed; said apparatus comprises a solenoid positioned below the cooker and beside the cooker for a height ranging from 50% to 70% of the total height of the cooker starting from the bottom; said solenoid is made of variable pitch coils widening from the bottom to the top; said pressure cooker comprises: a lid having a closing system; a pressure release valve; a cylindrically shaped mesh basket with the lower base open is positioned around the pressure release valve to form a backsplash; a temperature measurement system; where said cooker operates at a temperature higher than 140° C.; and wherein said lid is adapted for forcing a disc against protruding edges of said cooker, and a circular seal is positioned between said disc and said protruding edges.

2. The apparatus in accordance with claim 1, further including a hose, wherein said pressure release valve is adapted to be connected to the hose to instantaneously discharge steam, water and starch outside said cooker.

3. The apparatus in accordance with claim 1, characterized in that said cooker comprises a vessel positioned at the top thereof, having a diameter greater than the diameter of said cooker.

4. The apparatus in accordance with claim 1, characterized in that said lid comprises a bar having at the ends hooks adapted to operate with the lower part of the protruding edges of said cooker.

5. The apparatus in accordance with claim 1, characterized in that said lid comprises a removable mesh filter.

6. The apparatus in accordance with claim 1, characterized in that said temperature measurement system comprises a roller; when said cooker is lowered into said base structure, the bottom of the cooker hits said roller which causes an arm to rotate, forcing a temperature sensor against said cooker.

7. The apparatus in accordance with claim 1, characterized in that said pressure release valve is opened only at the end of cooking.

8. The apparatus in accordance with claim 1, characterized in that it comprises a perforated basket inside the cooker.

9. The apparatus in accordance with claim 8, characterized in that it comprises means for shaking said perforated basket.

10. The apparatus in accordance with claim 1, wherein the lid comprises a knob with a pin in a threaded through hole and connected to the disc.

11. The apparatus in accordance with claim 1, wherein the lid comprises a lever including an eccentric connected by a rod to a movable hook.

12. An apparatus for automatic and fast cooking of food in connection with a hose, comprising: a base structure in the form of a vessel open at the top in which a vertical pressure cooker is housed; said apparatus comprises a solenoid positioned in the vicinity of said cooker; said solenoid is positioned below the cooker and beside the cooker for a height ranging from 50% to 70% of the total height of the cooker starting from the bottom; said solenoid is made of variable pitch coils widening from the bottom to the top; said pressure cooker comprises: a lid having a closing system; a pressure release valve; a cylindrically shaped mesh basket with the lower base open is positioned around the pressure release valve to form a backsplash; a temperature measurement system; wherein said cooker operates at a temperature higher than 140° C., wherein said pressure release valve is adapted to be connected to the hose to instantaneously discharge steam, water and starch outside said cooker.

13. An apparatus for automatic and fast cooking of food comprising: a base structure in the form of a vessel open at the top in which a vertical pressure cooker is housed; said apparatus comprises a solenoid positioned in the vicinity of said cooker; said solenoid is positioned below the cooker and beside the cooker for a height ranging from 50% to 70% of the total height of the cooker starting from the bottom; said solenoid is made of variable pitch coils widening from the bottom to the top; said pressure cooker comprises: a lid having a closing system; a pressure release valve; a cylindrically shaped mesh basket with the lower base open is positioned around the pressure release valve to form a backsplash; a temperature measurement system; wherein said cooker operates at a temperature higher than 140° C., wherein said temperature measurement system comprises a roller, whereby when said cooker is lowered into said base structure, the bottom of the cooker hits said roller which causes an arm to rotate, forcing a temperature sensor against said cooker.

\* \* \* \* \*